S. McCLURE.
WATER POWER WHEEL.
APPLICATION FILED JAN. 10, 1911. RENEWED MAY 14, 1912.

1,033,433.

Patented July 23, 1912.

2 SHEETS—SHEET 1.

Witnesses
I. S. Edmunds
S. Hardy

Inventor
Samuel McClure
By P. J. Edmunds
Attorney

S. McCLURE.
WATER POWER WHEEL.
APPLICATION FILED JAN. 10, 1911. RENEWED MAY 14, 1912.

1,033,433.

Patented July 23, 1912.

2 SHEETS—SHEET 2.

Witnesses
I. S. Edmunds
S. Hardy

Inventor
Samuel McClure
By P. J. Edmunds
Attorney

UNITED STATES PATENT OFFICE.

SAMUEL McCLURE, OF OIL SPRINGS, ONTARIO, CANADA.

WATER-POWER WHEEL.

1,033,433.  Specification of Letters Patent.  Patented July 23, 1912.

Application filed January 10, 1911, Serial No. 601,896. Renewed May 14, 1912. Serial No. 697,302.

*To all whom it may concern:*

Be it known that I, SAMUEL MCCLURE, a subject of the King of Great Britain, and a resident of the village of Oil Springs, in the county of Lambton, in the Province of Ontario, in the Dominion of Canada, have invented a new and useful Water - Power Wheel, of which the following is a specification.
This invention relates to a wheel provided with buckets and so constructed that the water impinging on the buckets shall communicate to them its energy. And it consists of the improved construction and novel combination of parts of the same as will be hereinafter first fully set forth and described and then pointed out in the claims.

Figure 1:
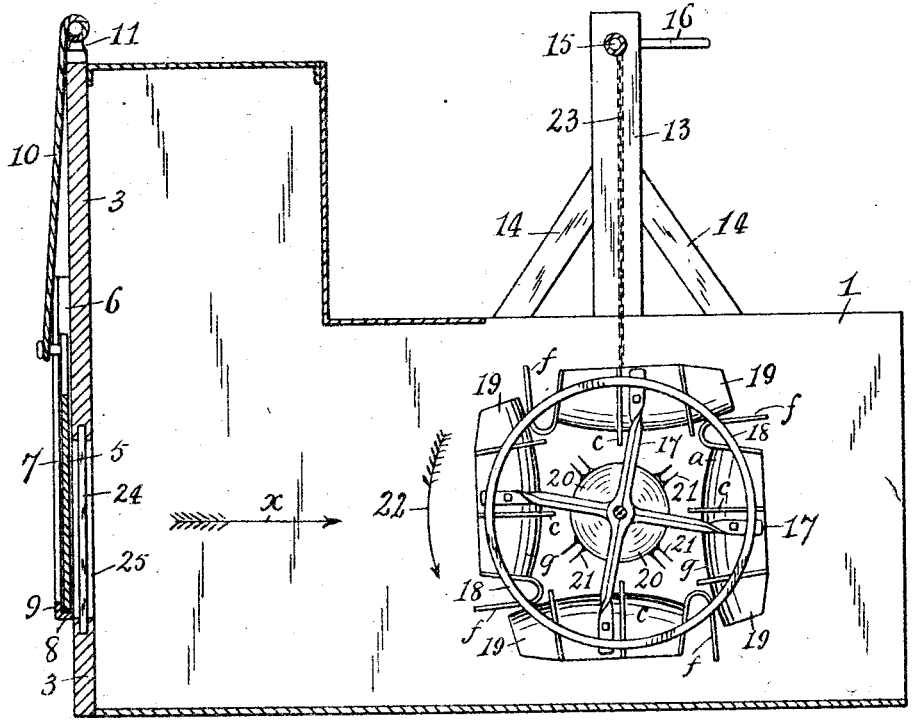
Figure 2:
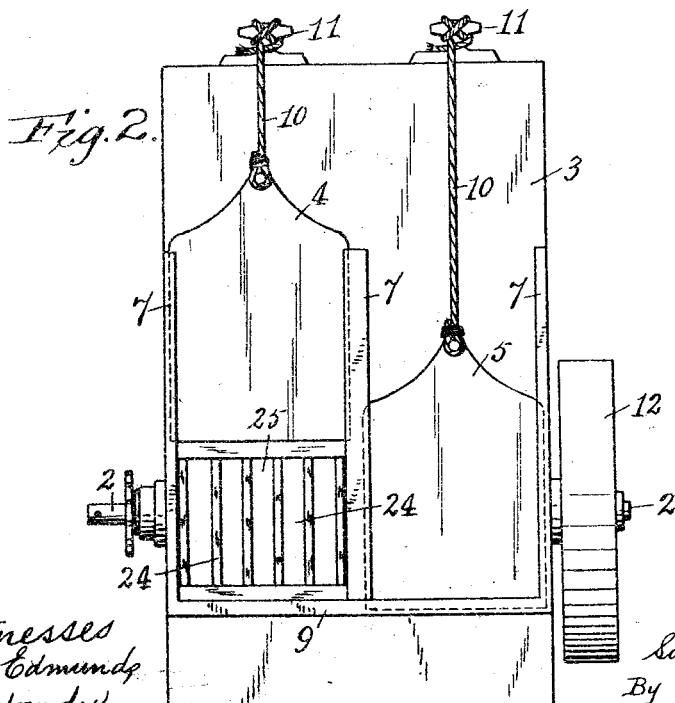
Figure 3:
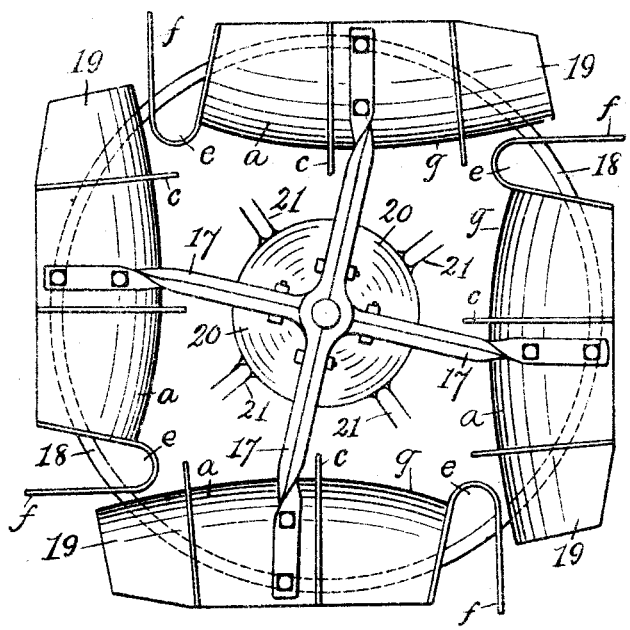
Figure 4:
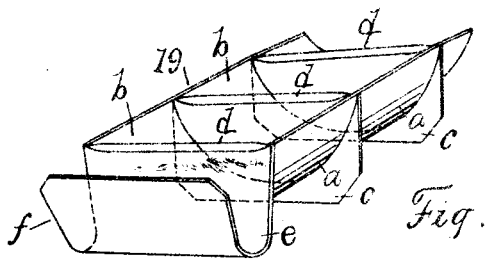

Reference being had to the accompanying drawings forming part of this specification wherein:

Figure 1 is a side view of a wheel race showing the water wheel embodying my invention. In this view the front side of the wheel race is removed. Fig. 2 is a front view of Fig. 1. In this view one of the gates is shown open and the other closed, and bars are shown in the opening to the wheel race when the gate is open or raised, to prevent large obstacles from getting into the wheel race and damaging the buckets of the water wheel. Fig. 3 is an enlarged detail side view of the water wheel. In this view the front ring is removed. Fig. 4 is a perspective view of one of the buckets or paddles of the wheel shown in Figs. 1 and 3.

In the accompanying drawings: the numeral 1 indicates the sides of the wheel race made of any size or shape and of any material, in which sides 1 the shaft 2 is supported to revolve perfectly free on roller bearings or on any bearing or means found most convenient.

3 indicates the front of the wheel race; 4 and 5 the gates supported and held in place in the vertical grooves 6 at the rear of the vertical guides 7, and these gates 4 and 5 are held at the lower end, in the horizontal groove 8 at the rear of the horizontal guide 9, and these guides 7 and 9 are secured to the front 3 of the wheel race, and said front 3 of said wheel race is secured to the sides 1.

10 indicates cables secured to the gates 4 and 5 and to the cleats 11 to hold these gates at any elevation to which they may be adjusted, to raise them out of the water, or to lower them, or to completely close and shut off the water from the wheel race, in case it is necessary to discontinue the operation of the wheel.

12 is a pulley on said shaft 2, over which a belt, not shown, passes, to communicate power to any place and for any purpose required, or a sprocket wheel or other means may be secured to this shaft 2, to communicate motion therefrom to any other machinery.

13 are uprights rigidly secured to both sides 1 of the wheel race above the shaft 2, and 14 are braces which are secured to and extend from the sides of the wheel race 1 to the uprights 13. 15 is a spindle mounted in said uprights 13, and 16 is a crank on said spindle 15 to operate the latter by hand power.

17 are arms rigidly secured near their centers to the main shaft 2, and to the outer ends of these arms 17 a ring 18 is soldered, riveted or otherwise rigidly secured, and this ring 18 and arm 17 may be made of angle iron or any other material desired.

19 are buckets or paddles which are riveted or otherwise rigidly secured to the outer ends of the arms 17 and the rings 18; and a set of arms 17 and a ring 18 is secured on the opposite sides of the buckets or paddles 19 of the water wheel. The buckets or paddles 19 are formed convex on the underside as shown at, *a* in Fig. 4, concave as shown at, *b*, with the wings, *c*, outside of the buckets 19, and with the partitions, *d*, which extend across the buckets as shown in Fig. 4, and these buckets are also formed with recess, *e*, between the lip, *f*, and the adjacent partition, *d*, they are also formed inclined and tapered toward the end and rounded on the back as shown at *g*. And these buckets or paddles 19 being rigidly secured to the arms 17 and the latter being rigidly secured to the shaft 2, as before described, when so constructed and being acted upon by the water of the stream moving in the direction of the arrow, *x*, the water wheel will turn in the direction indicated by the arrow 22, and when so turning, the concave side, *b*, of these concavo-convex buckets or paddles 19 will receive the full force or energy of the current of the water of the stream in which this wheel is located. Again the underside or portion, *a*, of the buckets being formed convex and the back or portion, *g*, of these buckets being formed rounded, this portion of these concavo-convex buckets or paddles 19 will feather the water when rising out of the current of the stream, and will not receive the full force of the current of the water. These buckets or paddles 19 therefore, are so constructed that the force or energy of the water of the stream will have the greatest effect on the concave side, *b*, on the wings, *c*, partitions, *d*, and lip, *f;* and when these buckets 19 are rising out of the water of the stream they will present their convex sides, *a*, and the round portion, *g*, to the water and thus feather the water and easily rise, thus providing a water wheel having great power. Any number of these water wheels desired may be used according to the power required.

20 indicates a water tight drum with closed ends, the ends of which are rigidly secured to the main shaft 2 and to the adjacent inner sides of the arms 17.

21 designates supplemental U-shaped blades or paddles which are secured at any interval desired around and to the water tight drum 20. And these blades or paddles 21 are formed U-shaped so that double the quantity of blades or paddles are provided which doubles the power of the water wheel at this point, as double the energy of the water is utilized on these blades or paddles 21. This water tight drum 20 formed with closed ends and secured in place as described, facilitates the rising of said wheel in the water when this water wheel secured to said shaft 2 is required to be raised, the water tight drum 20 has a natural buoyancy being water tight and has a tendency to rise in and with the water of the stream and facilitates the action of the chains or their equivalent 23 operated by the spindle 15. Again the bars 24 in the openings 25 at the front of the wheel race 3 prevent large pieces of ice, blocks of wood and large fish from getting into the wheel race and into the buckets or paddles 19 and thereby save the buckets 19 from being injured, and at the same time these bars 24 brace and strengthen the front of the wheel race. Again this wheel race may be constructed in line with or at any angle to the current of the water in the stream, as desired, and when constructed at an angle to the stream it sheds or conducts ice or other heavy articles floating with the stream, off to one side; and again when the gates 4 and 5 are closed, there will be less force of water against the end of the wheel race, when the latter is placed at an angle to the stream as described. Again covers may be placed over the pulley 12 or sprocket wheels on the shaft 2 to protect them from ice and the like if desired.

This water wheel may be located in a horizontal position when the arms 17 and rings 18 on the upper and lower side would strengthen the wheel and strengthen and hold any buckets used in place. Again an inclined chute or hopper may be used to conduct the water to a wheel constructed as described, in order to increase the effect of the water and the consequent power of the wheel provided with the buckets 19 and supplemental blades 21, as described. So that a water power wheel constructed as described forms a strong, durable and inexpensive device, one not liable to get out of repair and one very efficient in practical use.

Having thus described my invention, I claim:

1. In a device of the class described, arms, rings secured to the outer ends of said arms, and buckets or paddles also secured to the outer ends of said arms and said rings, and said buckets formed concave on the side presented to the current of the stream of water and convex on the other side, and rounded and inclined or tapered toward the ends on said convex side, in combination with a shaft to which said arms are secured, and means for supporting said shaft.

2. In a device of the class described, arms, rings secured to the outer ends of said arms, buckets or paddles also secured to the outer ends of said arms and said rings, and said buckets formed concave on the side presented to the current of the stream of water, and convex on the other side, and formed with wings on said convex side, in combination with a shaft to which said arms are secured, and means for supporting said shaft.

3. In a device of the class described, arms, rings secured to the outer ends of said arms, buckets or paddles also secured to the outer ends of said arms and said rings, and said buckets formed concave and with a lip on said concave side presented to the current of the stream of water, and convex on the other side, in combination with a shaft to which said arms are secured, and means for supporting said shaft.

4. In a device of the class described, arms, rings secured to the outer ends of said arms, buckets or paddles also secured to the outer ends of said arms and said rings, and said buckets formed concave and with partitions and a lip on said concave side presented to the current of the stream of water, and convex on the other side, in combination with a shaft to which said arms are secured, and means for supporting said shaft.

5. In a device of the class described, arms, rings secured to the outer ends of said arms, buckets or paddles also secured to the outer ends of said arms and said rings, and said buckets formed concave, with partitions, with a lip and a recess between said lip and the adjacent partition, on the side presented to the current of the stream of water, and convex on the other side, and rounded, inclined or tapered toward the ends and with wings on said convex side, in combination with a shaft to which said arms are secured, and means for supporting said shaft.

6. In a device of the class described, arms, rings secured to the outer ends of said arms, buckets or paddles also secured to the outer ends of said arms and said rings, said buckets formed concave, with partitions and a lip on the side presented to the current of the stream of water, and convex on the other side, and formed rounded, tapered or inclined toward the ends and with wings on said convex side, in combination with a shaft to which said arms are secured, a wheel race in the sides of which said shaft is supported, adjustable gates on the front of said wheel race and bars secured to said wheel race.

7. In a device of the class described, a shaft, means for supporting the latter, arms secured to said shaft, a water tight drum secured to said arms, and supplemental blades or paddles secured to said water tight drum, in combination with rings secured near the outer ends of said arms, and buckets or paddles also secured to the outer ends of said arms and said rings.

8. In a device of the class described, arms, rings secured near the outer ends to said arms, buckets or paddles also secured to the outer ends of said arms and said rings, a shaft to which said arms are secured, a water tight drum secured to said arms and said shaft, and supplemental blades or paddles secured to said water tight drum, in combination with a wheel race, in the sides of which said shaft is supported, adjustable gates secured to the front of said wheel race and bars secured to said wheel race.

In testimony whereof, I have signed in the presence of the two undersigned witnesses.

SAMUEL McCLURE.

Witnesses:
P. J. EDMUNDS,
S. HARDY.